United States Patent [19]

Marquardt et al.

[11] 4,328,325

[45] May 4, 1982

[54] PROCESS FOR THE PREPARATION OF POLYMERS CONTAINING URETHANE GROUPS

[75] Inventors: Klaus Marquardt; Hubert Wiest, both of Burghausen, Fed. Rep. of Germany

[73] Assignee: Wacker Chemie GmbH, Munich, Fed. Rep. of Germany

[21] Appl. No.: 136,544

[22] Filed: Apr. 2, 1980

[30] Foreign Application Priority Data

Apr. 12, 1979 [DE] Fed. Rep. of Germany ....... 2914984

[51] Int. Cl.$^3$ .................. C08F 216/12; C08F 220/36; C08F 220/60; C08F 283/00
[52] U.S. Cl. ............................... 525/451; 204/159.15; 204/159.16; 204/159.22; 204/159.23; 525/440; 526/218; 526/227; 526/264; 526/301
[58] Field of Search .............. 526/301, 264, 218, 227; 525/440, 451; 204/159.15, 159.16, 159.22, 159.23

[56] References Cited

U.S. PATENT DOCUMENTS

| | | | |
|---|---|---|---|
| Re. 29,131 | 2/1977 | Smith et al. ........................... | 528/75 |
| Re. 29,772 | 9/1978 | Niederhauser et al. ............ | 526/301 |
| 3,933,937 | 1/1976 | Rhodes et al. ...................... | 525/451 |
| 3,959,103 | 5/1976 | Larsen ................................. | 525/451 |
| 3,989,609 | 11/1976 | Brack .................................. | 525/451 |
| 4,064,194 | 12/1977 | Evans et al. ......................... | 528/75 |
| 4,082,710 | 4/1978 | Vrancken et al. .............. | 260/23 TN |

OTHER PUBLICATIONS

Chemical Abstracts 71, (1969), 39 797 f.

Primary Examiner—Harry Wong, Jr.
Attorney, Agent, or Firm—Hammond & Littell, Weissenberger and Muserlian

[57] ABSTRACT

The invention relates to a process for the preparation of polymers from polymerizable urethanes prepared by reacting isocyanates having at least two isocyanato groups with polyesters of the formula

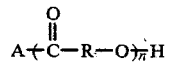

wherein R is alkylene having from 2 to 10 carbon atoms, A is an ethylenically-unsaturated radical, and n is an integer of from 1 to 100.

40 Claims, No Drawings

PROCESS FOR THE PREPARATION OF POLYMERS CONTAINING URETHANE GROUPS

FIELD OF THE INVENTION

This invention relates to the preparation of polymers containing urethane groups. More particularly, this invention relates to the polymerization of urethanes prepared from ethylenically unsaturated polyesters.

It is known, for example, from German Published Application (DE-OS) No. 19 58 211 to manufacture polymers, for example, from styrene, which have been internally plasticized by acrylic acid esters manufactured from hydroxyethyl acrylate and lactones. These polymers are rubber-like, white to pale brown, but have very little strength and, therefore, are of no practical value.

From German Published Application (DE-OS) No. 2 734 237, for example, radiation-hardenable compositions are known that are manufactured by reacting hydroxyethyl acrylate with a slightly more than stoichiometric amount of 4,4′methylene bis(cyclohexylisocyanate) to form unsaturated monoisocyanates. These monoisocyanates can be further reacted with polyhydroxy polyesters and hardened by irradiation. However, the compositions contain by-products, such as polyurethanes having an increased molecular weight, or unreacted poisonous diisocyanate. The necessary removal of the isocyanate is an especially complicated procedure.

It is also known to manufacture adhesives based on unsaturated polyesters in which, however, the problem of gelling as a result of uncontrolled polymerization of the double bonds actually occurs during manufacture. The double bond is introduced into these polymers by transesterification, as described, for example, in German Published Application (DE-OS) No. 26 07 955, at fairly high temperatures.

The problem has been, therefore, to provide a suitable process for the manufacture of polymers, starting from liquid monomers or monomer mixtures. The polymers should have equally good mechanical properties even in various layer thicknesses, in particular, good elasticity, have a soft-elastomeric to a tough-hard quality and, if desired, have good properties of adhesion to surfaces.

OBJECTS OF THE INVENTION

It is an object of this invention to provide an improved process for the preparation of polyurethane compositions.

It is also an object of this invention to provide a process for the manufacture of polymers from polymerizable urethanes containing unsaturated groups and, optionally, from further olefinically unsaturated compounds, wherein the polymerizable urethanes containing unsaturated groups which are polymerized or, optionally, copolymerized with further olefinically unsaturated compounds, by means of radical polymerization, are urethanes that have been manufactured by reacting diisocyanatoalkyl and/or polyisocyanatoalkyl and/or diisocyanatoaryl and/or polyisocyanatoaryl compounds with compounds of the general formula

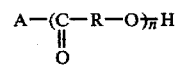  (I)

wherein R is alkylene having from 2 to 10 carbon atoms; n is an integer of from 1 to 100; and A is an ethylenically-unsaturated radical selected from the group consisting of

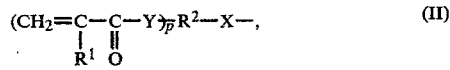  (II)

  (III)

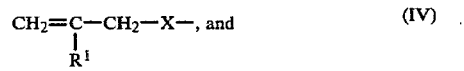  (IV)

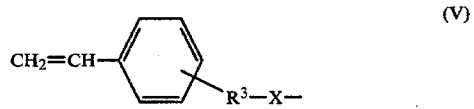  (V)

wherein $R^1$ is a member selected from the group consisting of hydrogen and methyl; $R^2$ is a member having $p+1$ functional bonds selected from the group consisting of an aliphatic saturated hydrocarbon radical having $p+1$ hydrogens removed and a cycloaliphatic saturated hydrocarbon radical having $p+1$ hydrogens removed; $R^3$ has the meaning of $R^2$ where p is 1; X is a member selected from the group consisting of oxygen or $-NR^4-$; Y is a member selected from the group consisting of oxygen, $-NH-$, and $-NR^4-$; $R^4$ is a member selected from the group consisting of methyl and ethyl; and p is an integer of from 1 to 3, where the ratio of isocyanato groups to hydroxyl groups is from about 0.2:1 to 1:1.

These and other objects of the present invention will become more apparent as the description thereof proceeds.

DESCRIPTION OF THE INVENTION

It has surprisingly been found that the problem of the prior art can be solved and the above objects can be achieved by preparing polymers from urethanes prepared from ethylenically unsaturated compounds. According to the invention, polymers are prepared from polymerizable urethanes containing unsaturated groups and, optionally, from further olefinically unsaturated compounds. The polymerizable urethanes containing unsaturated groups which are polymerized or, optionally, copolymerized with further olefinically unsaturated compounds, by means of radical polymerization, optionally in the presence of initiators and/or catalysts, are urethanes that have been manufactured by reacting diisocyanatoalkyl and/or polyisocyanatoalkyl and/or diisocyanatoaryl and/or polyisocyanatoaryl compounds with compounds of the general formula

  (I)

in which

R = straight-chain hydrocarbon radicals having from 2 to 10 carbon atoms, which may optionally be substituted by up to 5 methyl, ethyl and/or propyl groups, it being possible for all radicals R in a molecule of the Formula I to be the same or for the radicals R to be different, A = an ethylenically unsaturated radical of one of the general formulae

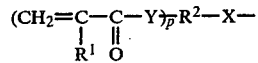 (II)

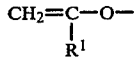 (III)

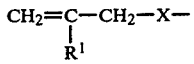 (IV)

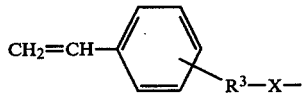 (V)

in which
$R^1$ = H or $CH_3$,
$R^2$ = a (p+1)-functional straight-chain or branched alkyl radical having from 1 to 20 carbon atoms or a (p+1)-functional cycloalkyl radical having from 3 to 20 carbon atoms,
$R^3$ = a radical having the same meaning as $R^2$ with p=1,
X = —O— or —$NR^4$—,
Y = —O—, —NH—, or —$NR^4$—,
$R^4$ = $CH_3$ or $C_2H_5$,
n = an integer of from 1 to 100, and
p = an integer of from 1 to 3, in such molar ratios that the numerical ratio of the isocyanato groups to the hydroxyl groups of the compounds of Formula I is from about 0.2:1 to 1:1.

In a preferred embodiment of the invention, the polymerizable urethanes containing unsaturated groups which are polymerized or copolymerized, are urethanes that have been prepared by reacting one or more isocyanates selected from the group consisting of alkyl monoisocyanates, aryl hydrocarbon monoisocyanates, cycloalkyl monoisocyanates, alkane diisocyanates, cycloalkane diisocyanates, cycloalkane triisocyanates, trimerized alkane diisocyanates, aryl hydrocarbon diisocyanates, and aryl hydrocarbon triisocyanates, wherein at least some di or trifunctional isocyanates are present, with a compound with a molecular weight of from 225 to 10,000, having a terminal hydroxyl group, of the formula

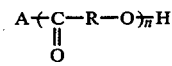

wherein R is alkylene having from 2 to 10 carbon atoms, n is an integer of from 1 to 100, and A is an ethylenically-unsaturated radical selected from the group consisting of

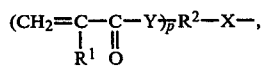

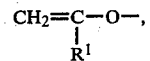

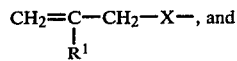, and

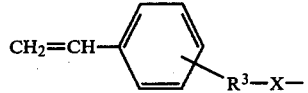

wherein $R^1$ is a member selected from the group of hydrogen and methyl; $R^2$ is a member having p+1 functional bonds selected from the group consisting of an aliphatic saturated hydrocarbon radical having p+1 hydrogens removed and a cycloaliphatic saturated hydrocarbon radical having p+1 hydrogens removed; $R^3$ has the meaning of $R^2$ where p is 1; X is a member selected from the group consisting of oxygen or —$NR^4$—; Y is a member selected from the group consisting of oxygen, —NH—, and —$NR^4$—; $R^4$ is a member selected from the group consisting of methyl and ethyl; and p is an integer of from 1 to 3, where the ratio of isocyanato groups to hydroxyl groups is from about 0.2:1 to 1:1.

It is possible as a result of the process according to the invention to manufacture polymers specific to a particular use, the mechanical properties of which polymers can be varied from elastomeric to tough-hard. The polymers manufactured according to the invention are especially distinguished by good resistance to the effect of heat and solvents and also, if desired, by good properties of adhesion to surfaces. The polymers are furthermore substantially free of by-products such as, for example, unreacted diisocyanates and non-radically polymerized polyester urethane compounds having isocyanato and hydroxyl terminal groups.

The polymers preferably have no free hydroxyl groups, a situation which is achieved by using urethanes that have been manufactured by reacting compounds of the Formula I with diisocyanatoalkyl and/or polyisocyanatoalkyl and/or diisocyanatoaryl and/or polyisocyanatoaryl compounds and, optionally, subsequently with alkylmonoisocyanato and/or arylmonoisocyanato compounds in such a molar ratio that the overall numerical ratio of the hydroxyl groups of the compounds of Formula I to the isocyanato groups is 1:1.

The urethanes used according to the invention preferably have molecular weights of from about 300 to about 20,000, more preferably from about 1,000 to about 8,000.

The urethanes used according to the invention are manufactured from compounds of Formula I and diisocyanatoalkyl and/or polyisocyanatoalkyl and/or diisocyanatoaryl and/or polyisocyanatoaryl compounds that contain at least two reactive isocyanato functional groups and are known to be suitable for the manufacture of polyurethanes. These compounds also include alkyl and aryl compounds in which the isocyanato groups have already been reacted with polyol compounds to form urethanes which, in turn, however, likewise possess at least two reactive isocyanato functions.

Accordingly, the alkyl and/or aryl monoisocyanate compounds mentioned include also reaction products of polyfunctional isocyanate compounds of the kind mentioned above with, for example, monofunctional alcohol, optionally, polyol compounds and alkyl and/or aryl monoisocyanates having an additional isocyanato function.

Individual examples of the various isocyanato compounds include diisocyanatobenzenes, diisocyanatotoluenes, 1,6-diisocyanatohexane, Desmodur ®L (a reaction product of trimethylolpropane and diisocyanatotoluene, available from Bayer AG), isocyanatobenzene, and methyl isocyanate.

The urethanes used according to the invention are prepared by reacting isocyanato compounds with compounds of Formula I, while cooling or at room temperature or while heating to not more than 100° C., preferably, however, to not more than 60° C. (See copending U.S. patent application Ser. No. 136,540 filed Apr. 2, 1980, now abandoned, incorporated herein by reference.)

The compounds of Formula I may be produced, for example, analogously to German Published Application (DE-OS) No. 1 958 211 or German Application No. P 29 14 988.0, filed Apr. 12, 1979, both incorporated herein by reference, by reacting ethylenically unsaturated compounds containing active hydrogen atoms with lactones.

The radicals A in Formula I are those of the various Formulae II to V. These compounds are produced for example by the reaction of a compound of Formulae II to V having an active hydrogen with a lactone.

The compounds of Formula II having a reactive hydrogen are hydroxy-$C_{1-20}$-alkyl-(meth)acrylates, hydroxy-$C_{5-20}$-cycloalkyl(meth)acrylates, methyl- and ethyl-amino-$C_{1-20}$-alkyl (methy)acrylates, methyl and ethyl-amino-$C_{5-20}$-cycloalkyl (meth)-acrylates, (meth)acrylamido-$C_{1-20}$-alkanols, N-methyl- or ethyl-N-(meth)-acryl-amino-$C_{1-20}$-alkanols, hydroxy-$C_{3-20}$-alkyl di(meth)acrylates, and hydroxy-$C_{4-20}$-alkyl tri(meth)acrylates.

Compounds of Formula I, wherein A has the meaning of Formula III are prepared, for example, by vinylation of a compound of the formula

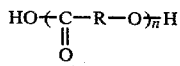

wherein R and n are as defined above, with vinyl acetate or isopropenylacetate in the presence of a suitable catalyst, such as $HgSO_4$ or $PdCl_2$.

The compounds of Formula IV having a reactive hydrogen are (meth)allyl alcohol and (meth)allylmethyl or ethyl amine.

The compounds of Formula V having a reactive hydrogen are hydroxy-$C_{1-20}$-alkylstyrene and N-methyl or ethyl-N-$C_{1-20}$-alkylstyrene amine.

Preferably the radicals A in Formula I are those of Formula II or IV, and especially those of the formulas

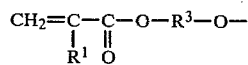

-continued

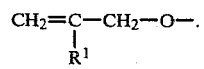

The radicals R in Formula I are preferably straight-chain hydrocarbon radicals having 2 to 6 carbon atoms which may optionally be substituted by up to 3 methyl, ethyl and/or propyl groups, especially preferably by up to 3 methyl groups. Examples of suitable lactones, from which the compounds of Formula I of Formula I may be derived, are propiolactone, pivalolactone, delta-valero-lactone, methyl-delta-valero-lactone, epsilon-caprolactone, methyl-epsilon-caprolactone, dimethyl-epsilon-caprolactone, trimethyl-epsilon-caprolactone, zeta-oenantholactone and kappa-undecalactone. The mentioned delta-valerolactones and the mentioned epsilon-caprolactones are preferred.

According to the invention, the polyesters are generally used as mixtures but they may alternatively be separated into the individual compounds and then used as single compounds.

It is preferable to use those polyesters of the Formula I the molecule weight of which is from 225 to not more than 10,000, a molecular weight of between 500 and 4,000 being especially preferred.

Alkyl isocyanates and aryl isocyanates are understood as being compounds having one or more isocyanato groups.

Alkyl monoisocyanates and/or aryl hydrocarbon monoisocyanates are preferably used after the compounds of Formula I have been reacted according to the invention with alkyl and/or aryl hydrocarbon compounds having several isocyanato groups, in order to react any free hydroxy groups of the compounds of Formula I that are still present and that have not reacted with the alkyl and/or aryl hydrocarbon compounds containing several isocyanato groups, likewise to form urethane groups. The compositions prepared according to the invention may, however, also contain some compounds of the Formula I that have not been reacted with isocyanato compounds.

Particularly suitable for the process according to the invention are those alkyl and/or aryl hydrocarbon compounds that have already been used as difunctional and/or polyfunctional alkyl and/or aryl hydrocarbon isocyanates for the production of urethane compounds, in particular polyurethane compounds.

Examples of difunctional and polyfunctional isocyanato aryl hydrocarbon compounds are diisocyanatobenzenes, diisocyanatotoluenes, 4,4'-diisocyanatodiphenylmethane, 1,5-diisocyanatonaphthalene, bis-(isocyanatomethyl)-benzenes, 4,4', 4"-triisocyanato-triphenylmethanes, 4,4'-diisocyanatodiphenyls, N,N'-(4,4'-dimethyl-3,3'-diisocyanatodiphenyl)-uretidine-dione, triisocyanatodiphenyl ethers and reaction products of trimethylolpropane and diisocyanatotoluene (Desmodur ®L, Bayer AG).

Examples of suitable difunctional or polyfunctional isocyanatoalkyl compounds or isocyanatocycloalkyl compounds are 1,6-diisocyanatohexane, trimerized hexamethylene diisocyanate (Desmodur ®N, Bayer AG), isophorone diisocyanate (3-isocyanatomethyl-3,5,5-trimethylcyclohexyl isocyanate), trimethylhexamethylene diisocyanate, octadecylene diisocyanate, 1,4-diisocyanatocyclohexane, 4,4'-diisocyanatodicyclohexylmethane and reaction products of trimethylolpropane and isophorone diisocyanate in a molar ratio of 1:3.

Examples of suitable monofunctional isocyanates are phenyl isocyanate, tolyl isocyanate, methyl isocyanate, butyl isocyanate and cyclohexyl isocyanate. The solidification points of the urethanes are generally within the range of from about $-50°$ C. to $+60°$ C. The production, according to the invention, of the hardenable compositions should be carried out with water being excluded to a high degree.

Prior to the preparation of the polymers according to the invention, the urethanes are generally liquid or melt below about 60° C. In addition, they are readily soluble in many organic solvents, the preferred solvents being those which are likewise olefinically unsaturated compounds and can be copolymerized according to the invention with the unsaturated urethanes. These other olefinically unsaturated compounds are present in such mixtures preferably in amounts of up to about 60% by weight, based on the total weight of all the polymerizable compounds in these mixtures.

The process according to the invention for the preparation of polymers from urethanes of the kind mentioned and, optionally, further olefinically unsaturated compounds, is carried out in such a manner that the urethanes and, optionally, further monomers that are copolymerizable therewith, are polymerized by means of radical polymerization.

Polymerization can be started by producing radicals by chemical means or by means of high-energy radiation. If the radicals are to be produced by chemical means, initiators are generally added which, as a result of heating, readily decompose to form radicals which, in turn, initiate polymerization.

Such initiators may, if desired, decompose even at room temperature, so that polymerization starts without additional heating. If this is not desired, an initiator having a higher decomposition temperature can be used or, alternatively, generally known polymerization inhibitors may be added. It is often sufficient to expose the reaction mixture to the oxygen of the surrounding atmosphere during storage, for example, in polyethylene vessels to prevent undesired polymerization at room temperature. On the other hand, in addition to initiators, catalysts or accelerators such as, for example, dialkylanilines, may optionally be added, which promote the formation of radicals from the initiators even at those temperatures which would not alone cause polymerization to be initiated. For the process according to the invention, all monomer-soluble initiators that are generally used for radical polymerization processes, for example, organic peroxidic compounds and azo compounds, are suitable. They are used preferably in amounts of from about 0.001 to 10% by weight, more especially from about 0.1 to 3% by weight, based on the total weight of all the monomers.

Polymerization can also be initiated according to the invention by irradiation with high-energy radiation, for example, electron radiation, gamma radiation or UV-light. Since, according to past experience, only low polymerization speeds have often been achieved with UV-light, the presence of UV-sensitizers is frequently advantageous. These sensitizers improve the formation of radicals during the irradiation of the compositions used according to the invention, as a result of which the speed of polymerization can be increased.

Examples of such initiators include, inter alia, thioxanthen-9-one, 2-methylthioxanthen-9-one, 2-chloro-thioxanthen-9-one, benzoin, benzoin alkyl ethers, benzil, benzil dialkyl ketals, benzophenone, 2,2-diethoxyacetophenone or Michler's ketone. The activity of some of these compounds such as, for example, benzil, benzophenone, thioxanthen-9-one, 2-methylthioxanthen-9-one or 2-chlorothioxanthen-9-one, can significantly be increased by the addition of co-initiators. Suitable co-initiators are, for example, tertiary amines. Especially suitable tertiary amines are, for example, dimethylethanolamine, methyldiethanolamine or ethyl 4-dimethylaminobenzoate.

The UV-initiators may be used alone or as mixtures, optionally also with one or several co-initiators. The amounts used are preferably within the range of from about 0.001 to 10% by weight, more especially from about 0.5 to 5% by weight, based on the monomers, and can easily be determined by a few experiments.

By the process according to the invention it is advantageously possible to prepare, in particular, elastomeric molded articles of varying hardness and flexibility, for example, toothed wheels, castors, hammer bodies, shoe soles, brushes, seals, bellows, vibration dampers, cable sleeves, packings and flexible molds for the manufacture of works of art, tools and prefabricated parts, for example, made from plaster or concrete. It is also possible to advantageously prepare the polymers as soft-elastomeric to tough-hard, abrasion-proof and heat-resistant varnishes, coatings and coverings on various materials such as, for example, textiles, wood and metal.

Another field of use is, for example, radiation-hardenable printing inks. Furthermore, by using the process according to the invention for joining surfaces, very firm adhesive bonds can advantageously be produced. If polymers are manufactured by the process according to the invention as coverings on metal surfaces, they are distinguished by outstanding adhesion to the surfaces even when the metal parts have been shaped mainly by beating.

If the elastomeric properties rather than the hardness and abrasion resistance are of special importance, it would be preferable to employ in the process according to the invention urethanes that have been manufactured by reacting compounds of the Formula I wherein A, R, $R^1$, $R^2$, $R^3$, $R^4$, X and Y have the meanings given above, p is 1 and n is an integer of from about 2 to 100, preferably from about 3 to 30, with diisocyantoalkyl or polyisocyanatoalkyl and/or diisocyanatoaryl or polyisocyanatoaryl compounds that are already known as being suitable for elastomeric polyurethanes. Especially preferred are urethanes in which A represents

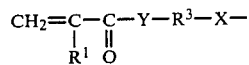

or

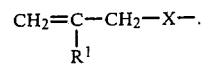

Examples of especially preferred meanings of A include the 2-hydroxyethyl-, 4-hydroxybutyl-, and N-Methyl-(2-amino)ethyl acrylate and -methacrylate, and allyloxy-methylallyloxy-, and N-hydroxymethyl acrylamide and -methacrylamide radicals. More particularly, the hydroxyalkyl acrylate and methacrylate radicals mentioned are especially preferred.

Other suitable radicals are the vinyloxy- and p-hydroxymethylstyrene radical.

If the polymers manufactured according to the invention are to be colorless, it is advantageous to use urethanes which, in the parts formed by diisocyanato and polyisocyanato compounds, are substantially free of aromatic groups, i.e., the urethanes have advantageously been prepared from alkylisocyanato or cycloalkylisocyanato compounds rather than arylisocyanato compounds. If they are to be clearly transparent and especially soft-elastomeric, it may be advantageous to proceed from a mixture of the urethanes and compounds of the Formula I described above which is produced by reacting the compounds of the Formula I with the diisocyanato or polyisocyanato groups in a ratio of isocyanato groups to the hydroxy groups of the compounds of Formula I of less than 1, and to react the free hydroxy groups still present in this mixture with monoisocyanato compounds to obtain transparency.

The elastomeric polymers manufactured according to the invention are surprisingly noticeably superior to the rubber-like products of German Published Application (DE-OS) No. 19 58 211 with regard to their mechanical properties.

The properties of the products manufactured according to the invention can be further modified by copolymerization of the above-mentioned urethanes with further olefinically unsaturated compounds that are soluble in, or miscible with, and copolymerizable with the urethanes and by the addition of further additives customary in polymers. The olefinically unsaturated compounds may, insofar as they are inert with respect to isocyanates, be used as solvents in the manufacture of the urethanes, so that expensive purifying and separating steps are not necessary.

Comonomers suitable for copolymerization according to the invention with the urethanes already defined include especially compounds that are liquid at room temperature and can be polymerized by means of radical polymerization. Such comonomers include for example, acrylic and methacrylic acids, preferably the esters of these acids with alkanols having up to 8 carbon atoms, for example, esters of the two acids mentioned with methanol, ethanol, a propanol, a butanol, or 2-ethylhexanol. Also suitable are acrylonitrile, methacrylonitrile, styrene, substituted styrenes, such as vinyl toluene and vinyl esters of alkanoic acids having from 1 to 18 carbon atoms, preferably vinyl acetate. Especially preferred are methyl methacrylate and styrene. The comonomers mentioned to be polymerized with the urethanes in the process according to the invention are used preferably in amounts of from about 0 to 60% by weight, more preferably from about 20 to 40% by weight, based on the total weight of all the copolymerizable compounds. Compounds of Formula I which have not been reacted with the isocyanato compounds may optionally also be present.

The reaction mixture, which is generally liquid at room temperature, can be polymerized by means of free radicals. The free radicals may be produced by chemical means or by radiation, for example, with electron rays or by UV-radiation or gamma-radiation. In so doing, it is often advantageous to add sensitizers of the kind already mentioned and, optionally catalysts, such as tertiary amines, prior to polymerization according to the invention.

It is frequently advantageous, however, to produce the free radicals by chemical means, especially in the case of thick layers or in polymerization in molds. Especially suitable for this purpose are thermally decomposing organic peroxidic compounds or azo compounds. Suitable peroxidic compounds include, among many others, tert-butyl perpivalate, tert-butyl peroctoate, tert-butyl-cyclohexyl percarbonate, tert-butyl perbenzoate, tert-butyl perisononanoate, 2,2-bis-(tert-butyl-peroxy)butane, benzoyl peroxide, di-tert-butyl peroxide, dicumyl peroxide, and methyl isobutyl ketoperoxide. A suitable azo compound is, for example, azoisobutyronitrile.

Peroxides may also be used in combination with accelerators so that hardening occurs even at room temperature. Suitable combinations are, among many others, the combination of benzoyl peroxide with dimethylaniline, dimethyl-p-toluidine or diethylaniline, the combination of ketoperoxides, such as methyl ethyl ketoperoxide or cyclohexanone peroxide with cobalt octoate, or the combination of tert-butyl peroctoate with vanadyl di-p-toluenesulphonate.

The suitable amount of compounds for producing free radicals preferably lies within the range of from about 0.001 to 10% by weight, more preferably from about 0.1 to 3% by weight, based on the monomers, and can easily be determined by a few experiments.

Other additives may also be incorporated into the mixtures that can be used in the process according to the invention for the preparation of elastomeric polymers. Such additives include, for example, active or inactive fillers for modifying the mechanical properties of the polymers, the flow behavior of the mixture prior to polymerization, or the shrinkage that occurs during polymerization. Fume silicas or carbon blacks are examples of active fillers. They are generally used in amounts of from about 0 to 20% by weight, based on the total weight. Examples of inactive fillers include, among many others, quartz powder, calcium carbonate, diatomaceous earths, and microglass balls. They are generally incorporated in amounts of from about 0 to 100% by weight. Examples of agents for modifying the flow behavior are, apart from fume silica, also organic agents that promote thixotropy such as, for example, ricinus derivatives (THIXATROL ST ®). Examples of fillers for reducing shrinkage in the polymerization process according to the invention are, for example, polyvinyl acetates, polymethyl methacrylate, or polycaprolactone.

In addition to the fillers, a total of up to about 10% by weight of dyes or color pigments, UV-absorbers, flame-proofing agents, and anti-aging agents may also be present in the mixtures used in the process according to the invention.

If the process according to the invention is carried out in air, sticky surfaces may be produced due to the inhibitory effect of oxygen. To prevent this, small amounts of paraffin having a melting point of approximately 50° C., dissolved in a solvent or one of the monomers, may be added.

If polymers prepared according to the invention are used as protective coatings, lacquers, or coverings in which, in addition to toughness, abrasion-resistance is especially important, urethanes that have been prepared from diisocyanatoalkyl and/or polyisocyantoalkyl, and-/or diisocyanatoaryl and/or polyisocyanatoaryl compounds, such as those mentioned above and compounds of Formula I having a preferred degree of polymerization n of from 1 to 20, more especially from 1 to 10, are preferably polymerized or, optionally, copolymerized with further olefinically unsaturated compounds. Of these compounds of Formula I, those which contain groups of the Formula II as groups A are in turn preferred.

If especially hard polymers are desired, it is possible to use urethanes in which p is greater than 1, as a result of which the number of crosslinkages in the polymers can be increased.

Examples of preferred radicals A in the urethanes are the 2-hydroxyethyl acrylate, 4-hydroxybutyl acrylate, N-Methyl-2-aminoethyl acrylate, 2-hydroxyethyl methacrylate, 4-hydroxybutyl methacrylate, N-Methyl-2-aminoethyl methacrylate, N-(hydroxy-methyl)methacrylamide, N-(hydroxymethyl)acrylamide, diacryloylglycerol, dimethacryloylglycerol, triacryloylpentaerythritol, and trimethacryloylpentaerythritol radicals. Other suitable radicals are the vinyloxy, allyoxy, methallyloxy, and p-hydroxymethylstyrene radicals. Especially preferred are hydroxyalkyl acrylate and methacrylate radicals having primary hydroxy groups, i.e., the hydroxy groups are bonded to $CH_2$ groups.

If the urethanes are to be polymerized according to the invention in a very short time by UV-radiation, urethanes in which the radicals A are derivatives of acrylic acid are especially preferred.

Furthermore, for the manufacture according to the invention of polymers especially suitable as lacquers, coverings, and coatings, urethanes in the preparation of which all the hydroxy terminal groups have been reacted with polyfunctional isocyanates, that is, the isocyanates have been used in the preparation of the urethanes in amounts such that each hydroxyl group of a compound of Formula I has been reacted with an isocyanato group are especially preferred. If the coatings, lacquers, and coverings prepared according to the invention are to be colorless, the urethanes preferably do not contain any aromatic radicals derived from the isocyanato compounds.

The polymers that are to be used as lacquers, coverings, and coatings are also preferably prepared according to the invention by copolymerization of the unsaturated urethanes with further olefinically unsaturated, radically polymerizable compounds that are liquid at room temperature.

Preferred as such compounds are the esters of acrylic acid and methacrylic acid with alkanols having up to 8 carbon atoms, for example, with methanol, ethanol, a propanol, a butanol, especially n-butanol, ethylhexanol, or with 2-ethoxyethanol; the vinyl esters of alkanoic acids having from 1 to 18 carbon atoms, especially vinyl acetate; N-vinyl-2-pyrrolidone; and monomers having several double bonds, especially polyesters of acrylic acid and methacrylic acid with polyhydroxy compounds, for example, dimethacrylates, diacrylates and dimethacrylates of ethylene glycol, butanediol, and hexanediol; triacrylates and trimethacrylates of diethylene glycol, triethylene glycol, glycerin, trimethylolpropane, and pentaerythritol; and pentaerythritol tetraacrylate and tetramethacrylate.

Other suitable unsaturated compounds are acrylonitrile, methacrylonitrile, styrene, and substituted styrenes, such as vinyltoluene.

If the polymerization according to the invention is to be initiated by UV-radiation, the derivatives of acrylic acid are preferred due to the high speed of polymerization.

The viscosity of the mixtures used for the polymerization according to the invention can be controlled in a desired manner by the addition of certain monomers; for example, the addition of N-vinyl-2-pyrrolidone lowers the viscosity of the mixture.

Polymerization may be initiated and controlled in the manner described above for polymerization to form elastomers. Thus, the same amounts, if desired, of the same initiators, catalysts and sensitizers as are there described can be used.

The different methods for producing free radicals can also be combined. Thus, for example, polymerization can first be started by irradiation with high-energy radiation and subsequently continued by use of initiators that undergo thermal decomposition to form radicals. The reverse process may also be carried out, of course. It is, of course, also possible to prepare in this manner soft-elastomeric polymers in greater thicknesses.

In addition to the initiators, catalysts, and sensitizers already mentioned, the compositions used in the process according to the invention for the preparation of polymer lacquers, coatings, and coverings can contain other additives, such as, for example, polymeric compounds, plasticizers, modifying agents that affect the flow behavior, pigments, dyes, fillers, flame-proofing agents, and anti-aging agents.

Although a special advantage of the compositions mentioned resides in the fact that they are liquid even without solvents, the presence of small amounts of solvents, such as aliphatic and aromatic hydrocarbons, preferably lower alkanes or $C_6$–$C_{10}$ aromatics, is not excluded.

Examples of polymeric compound additives include, inter alia, polyethylene, polymethyl methacrylate, polyethyl acrylate, polystyrene, polyvinyl chloride, polyvinyl acetate, polybutadiene, polyvinylpyrrolidone, and copolymers thereof. They are preferably used in the amounts of from 0 to about 20% by weight, based on the total weight of the mixtures used in the process according to the invention. These polymeric compounds can facilitate the application of the compositions mentioned to substrates to be covered with the polymers.

Examples of plasticizers, which are used preferably in amounts of from 0 to about 20% by weight, based on the total weight of the mixtures used according to the invention, include for example, esters of phthalic acid, adipic acid, or sebacic acid with relatively long-chain aliphatic alcohols, chlorinated paraffins, polyester plasticizers and phosphate plasticizers, such as trioctyl phosphate and tricresyl phosphate.

Examples of fillers are quartz powder and calcium carbonate. Examples of pigments are titanium dioxide and zinc sulphide, Heliogen blue, Heliogen green, and Paliogen red. These additives are used preferably in amounts of from 0 to about 50% by weight, based on the total weight of the mixtures polymerizable according to the invention.

The polymers defined above and prepared according to the invention are exceptionally suitable as abrasion-resistant and heat-resistant lacquers, coatings, and coverings on, for example, wood substrates or metal, such as sheet metal, and generally do not chip off even in the case of considerable shaping by beating. Other fields of use for the process according to the invention are the coating of paper, cardboard, and textiles and the encapsulation of electronic components, especially, since the polymers prepared can also be transparent.

The process according to the invention can also be carried out in such a manner that the resulting polymers can serve as permanent adhesive bonds.

Especially advantageously, the polymers can be prepared in such a manner that the reaction according to the invention does not start until the mixture of unsaturated urethanes and, optionally, other compounds and additives used, is exposed to the effect of oxygen, for example, from the atmosphere. In this case, the urethanes used according to the invention are preferably those that have no free hydroxyl groups that is, those in the preparation of which the compounds of Formula I have been reacted with polyfunctional isocyanates of the kind already defined in such a ratio that every hydroxyl group could be reacted with one isocyanato group.

Especially preferred urethanes are those in which the groups A have the meanings of Formula II and the degree of polymerization n is an integer of from 1 to 20, especially from 1 to 10.

Here, as with all the urethanes used according to the invention, there is usually a mixture of different urethanes, for the preparation of which mixtures of compounds of Formula I having medium degrees of polymerization, in each case within the ranges stated for n, have been used.

The urethanes used according to the invention for the preparation of polymers serving as adhesive bonds may be mixed with other olefinically unsaturated compounds and copolymerized according to the invention. The above-mentioned urethanes are preferably present in these mixtures in amounts of up to about 90% by weight, based on the total weight. More especially, they are copolymerized with from about 10 to 60% by weight, based on the total amount of polymerizable constituents, of methacrylic acid esters of alcohols and cycloalkanols optionally still containing free hydroxyl groups. Examples of suitable methacrylates are tetrahydrofurfuryl, 5,6-dihydrodicyclopentadienyl, cyclohexyl, ethylhexyl, hydroxyethyl, and hydroxypropyl methacrylates; ethylene glycol, diethylene glycol, triethylene glycol and polyethylene glycol dimethylacrylates; trimethylolpropane trimethacrylate; pentaerythritol trimethacrylate; and pentaerythritol tetramethylacrylate.

In an especially preferred embodiment, the mixtures that are used according to the invention for the manufacture of adhesive bonds or seals, consisting of polymers, contain from 40 to 80% by weight of the unsaturated urethanes defined above and from 20 to 60% by weight of methacrylic acid esters, based, in each case, on the total amount of polymerizable constituents. In addition, small amounts of polymerizable carboxylic acids, such as methacrylic acid, acrylic acid, fumaric acid, maleic acid and crotonic acid, may also be present.

For the manufacture of the adhesive bonds by the process according to the invention, polymerization is advantageously initiated by compounds that undergo thermal decomposition to form radicals such as, for example, peroxides and hydroperoxides that are soluble in the above-mentioned compounds.

Examples of these are tert-butyl esters of perbenzoic acid, perphthalic acid and peracetic acid; tert-butylperoxy isopropylcarbonate, n-butyl(4,4-bis-tert-butylperoxy)valerate, 2,2-bis(tert-butylperoxy)-butane, di-tert-butyl peroxide, 2,5-dimethyl-2,5-bis-(tert-butylperoxy)hexane, and bis(1-hydroxy-cyclohexyl) peroxide.

Especially suitable are organic hydroperoxides derived from hydrocarbons having from about 3 to 18 carbon atoms. Examples of these are tert-butyl hydroperoxide, cumene hydroperoxide, methyl ethyl ketone hydroperoxide, and diisopropylbenzene hydroperoxide.

The peroxides are used in the process according to the invention preferably in amounts of from about 0.1 to 20% by weight, especially from about 0.5 to 10% by weight, based on the total weight of the mixture.

To prevent uncontrolled polymerization, stabilizing additives may also be introduced into the mixtures suitable for the process according to the invention. Suitable stabilizers are, for example, polyhydric phenols and quinones, for example, hydroquinone and di-tert-butyl hydroquinone. In general, these inhibitors are advantageously used only in small amounts of from about 0.01 to 0.1% by weight, based on the total weight. If desired, however, polymerization accelerators may also be present, such as tertiary amines, for example, triethylenediamine, dimethylaniline and mercaptans, for example, octyl and dodecyl mercaptans, and hydrazides, such as toluene-sulphonic acid hydrazide. They are optionally added preferably in amounts of from about 0.1 to 5% by weight, based on the total weight.

It is, of course, also possible to incorporate other additives, for example dyes and plasticizers, into the polymers manufactured according to the invention by adding them to the mixtures to be polymerized according to the invention, which may also be called reactive adhesives, prior to polymerization. It is also possible to incorporate into these mixtures, in the amounts hitherto customary, thickening agents, for example, polyethyl acrylate and polystyrene, and fillers such as finely divided silica, calcium silicate, bentonite, calcium carbonate, and titanium dioxide. The mixtures described above to be polymerized according to the invention advantageously polymerize only when the supply of oxygen, for example, from the atmosphere, is cut off.

Thus, polymerization according to the invention can be prevented by keeping the finished mixtures in vessels which are permeable to oxygen, optionally, only to a slight degree, for example, vessels made of polyethylene. On the other hand, even after storage for weeks or months, it is possible to initiate polymerization according to the invention deliberately by cutting off the supply of oxygen to the reactive adhesives.

The process according to the invention is therefore especially suitable for sticking together surfaces, preferably of metals, such as iron, brass, copper, and aluminium, or for sealing joints. For this purpose, small amounts of the mixture polymerizable according to the invention are applied between the surfaces to be joined, which are placed one on top of the other in such a manner that air or oxygen is excluded. After a short time, for example, after approximately 1 to 3 hours, a bond had already formed between the materials mentioned which after approximately 24 to 120 hours attains its final strength. If desired, polymerization according to the invention can be accelerated by heating to approximately 150° C.

If the process according to the invention is to be used for sticking together or sealing glass, plactics material or metals that are catalytically low in activity such as zinc, cadmium, high alloy steels or anodized aluminium, it is often expedient to treat these materials beforehand with metal salts having an accelerating action, for example, copper naphthenate, or cobalt naphthenate.

Technical applications of the process according to the invention for the manufacture of polymers as adhesive bonds are, inter alia, fixing of screws in their threads, sealing of screw connections, fixing of plug-in connections and sealing of flanges.

The following examples serve to illustrate the invention in more detail. Propiolactone, valerolactone and caprolactone always denote beta-propiolactone, delta-valerolactone and epsilon-caprolactone, respectively. All percentages given are based on the total weight of the mixtures unless otherwise stated.

EXAMPLES

Example 1

An unsaturated compound of general Formula I was polymerized from 130.1 g (1 mol) of hydroxyethyl methacrylate and 688.5 g (6 mols) of caprolactone in the presence of 0.82 g (0.1% by weight) of p-toluene-sulphonic acid and 0.82 g (0.1% by weight) of 2,5-di-tert-butylquinone at 20° to 40° C. over a period of 12 hours.

Comparison Example A

The unsaturated compound from Example 1 was mixed with methyl methacrylate in a weight ratio of 70:30 and, after the addition of 5.85 g (0.5% by weight) of tert-butyl peroctoate, polymerized at from 60° to 80° C. between glass plates for six hours to form a 3 mm thick sample plate. An opaque white, soft material was obtained, the properties of which are given in Table 1 below.

Comparison Example B

A compound prepared, in a manner similar to that of Example 1, from 130.1 g (1 mol) of hydroxyethyl methacrylate and 2295 g (20 mols) of caprolactone was dissolved in methyl methacrylate in a weight ratio of 70:30 and polymerized with 17.32 g (0.5% by weight) of tert-butyl peroctoate overnight at 60° C. A material which was whitish-cloudy, soft and sticky above 50° C. was obtained which, after cooling, solidified to form a white, hard-brittle body with no elastic properties.

Example 2

One mol of the compound prepared according to Example 1 was reacted with a stoichiometric amount (0.5 mol) of diisocyanatotoluene in the melt at 50° C. The resulting urethane was then dissolved in methyl methacrylate in a ratio of 70:30 and polymerized with 0.5% by weight of tert-butyl peroctoate at from 60° to 80° C. over a period of six hours.

Example 3

Example 2 was repeated with the modification that the methyl methacrylate was replaced by the same amount of styrene.

Example 4

Example 2 was repeated with the modification that no methyl methacrylate was added.

Example 5

Comparison Example B was repeated with the modification that, prior to polymerization, the compound of Formula I was reacted with 0.5 mol of diisocyanatotoluene at room temperature. Subsequent polymerization produced a clear, faintly yellowish, very elastic sample, which did not become cloudy even at −20° C.

Example 6

An unsaturated compound prepared, in a manner similar to that of Example 1, from 1 mol of 4-hydroxybutyl acrylate and 3 mols of caprolactone, was reacted with diisocyanatotoluene at from 15° to 20° C. This product (viscosity 1130 mPa's) was mixed with methyl methacrylate in a weight ratio of 70:30 (viscosity of the mixture 33 mPa's) and, after the addition of 0.5% by weight of tert-butyl peroctoate, polymerized at 60° C.

Example 7

An unsaturated compound prepared, in a manner similar to that of Example 1, from 1 mol of hydroxyethyl methacrylate and 5 mols of caprolactone, was reacted with 0.33 mol of trimerized hexamethylene diisocyanate (Desmodur ® N, manufactured by Bayer AG) and 0.1% by weight of dibutyltin dilaurate at room temperature over a period of six hours. Two percent by weight of benzoin was added to a solution of 70 parts by weight of the urethane so produced in 30 parts by weight of methyl methacrylate. This mixture was placed in a 3 mm deep dish, covered with a thin polyester film, and irradiated for 30 minutes with UV light (wavelengths of from 300 to 830 nm, xenon emitter, radiation intensity 585 W/m$^2$) and thus polymerized.

Example 8

The compound from Example 1 was reacted at room temperature with 0.5 mol of isophorone diisocyanate (3-isocyanatomethyl-3,5,5-trimethylcyclohexyl-isocyanate), with the addition of 0.1% by weight of dibutyltin dilaurate. Seventy percent by weight of the urethane so produced was dissolved in 30 parts by weight of methyl methacrylate and, after the addition of 0.5% by weight of tert-butyl peroctoate, polymerized at 70° C.

Example 9

An unsaturated compound prepared, in a manner similar to that of Example 1, from 1 mol of allyl alcohol and 5 mols of caprolactone, was reacted with 0.33 mol of trimerized hexamethylene diisocyanate (Desmodur ® N) at 60° C. over a period of three hours. Seventy parts by weight of the urethane so produced were dissolved in 30 parts by weight of methyl methacrylate and, after the addition of 3% by weight of tert-butyl peroctoate, polymerized at a temperature slowly rising from 60° to 100° C. over a period of eight hours.

Example 10

Seventy parts by weight of the compound (7 mol) from Example 1 were dissolved in 30 parts by weight of methyl methacrylate and reacted with 0.1 mol of diisocyanatotoluene and then with 0.8 mol of phenyl isocyanate at room temperature. After polymerization, with the addition of 0.5% by weight of tert-butyl peroctoate, at from 60° to 80° C., a faintly yellowish, but clearly transparent, sample plate was obtained.

Example 11

Example 5 was repeated with the addition to the unpolymerized urethane of 10% by weight of highly dispersed silica (Wacker HDK ® H 2000, manufactured by Wacker-Chemie GmbH, Munich).

Example 12

Example 11 was repeated with the modification that, instead of the highly dispersed silica, 50% by weight of quartz powder (Type N 400) was added as a filler.

The materials prepared according to Comparison Example A and Examples 2 to 12 were all hardened between glass plates sprayed with separating agents. A 3 mm thick seal of nitrile rubber was used as a spacer. The materials were tested, and the results of the testing, i.e., the properties of the materials are set forth in Table 1.

TABLE 1
Properties of the Products Manufactured in Examples 2 to 12

| Example No. | Appearance | Tensile Strength[1] (N/mm$^2$) | Elongation at Break[1] (%) | Shore Hardness[2] | Tear Propagation Resistance[3] (N/mm) | Glass Transition Temperature (°C.) |
|---|---|---|---|---|---|---|
| Comp. A | whitish, cloudy | 0.5 | 301 | A 10 | 3 | — |
| 2 | clear, faintly yellow | 13.0 | 220 | A 71 | 27 | −9 |
| 3 | clear, faintly yellow | 9.6 | 200 | A 69 | 23 | — |
| 4 | clear, colorless | 2.0 | 31 | A 79 | 4 | — |
| 5 | clear, faintly yellow | 9.7 | 435 | A 57 | 18 | −4 |
| 6 | clear, yellowish | 8.4 | 120 | A 76 | 32 | — |
| 7 | clear, colorless | 8.6 | 150 | A 77 | 22 | — |
| 8 | clear, colorless | 10.0 | 190 | A 71 | 24 | — |
| 9 | clear, colorless | 8.4 | 100 | A 86 | 21 | — |
| 10 | clear, yellowish | 2.6 | 230 | A 38 | 10 | — |
| 11 | almost clear, faintly yellow | 9.5 | 186 | A 94 | 66 | — |
| 12 | brown-grey | 5.9 | 42 | A 94 | 62 | — |

[1] Tested according to DIN 53504
[2] Tested according to DIN 53505
[3] Tested according to ASTM-D 624 B

Example 13

The permanent set of the elastomers prepared according to Examples 2 and 5 was determined according to DIN 53517 (Deutsche Industrienorm) at room temperature and with 70 hours loading. The following values were obtained:

|  | Example 2 | Example 5 |
|---|---|---|
| Immediately after unloading (%) | 0.8 | 2.4 |
| 1 minute after unloading (%) | 0.8 | 0.9 |
| 20 hours after unloading (%) | 0.3 | 0.5 |

Examples 14 to 26

Examples 14 to 26 illustrate the suitability of the process according to the invention for the manufacture of coatings. For this purpose, various compounds manufactured in a manner similar to that of Example 1 were first reached with isocyanates to form urethanes. The preparation conditions and compositions of the urethanes are set forth in the following table:

TABLE 2
URETHANE PREPARATION CONDITION AND COMPOSITION

| No. | Composition | Catalyst | Duration of Reaction | Reaction Temperature | Properties of the Urethane (at room temperature) |
|---|---|---|---|---|---|
| a | 1 mol HBA, 6 mols CL, 0.333 mol trimerized DIT | 0.15% by weight DBTL | 7 hours | 45° C. | waxy |
| b | 1 mol HBA, 3 mols CL, 0.5 mol DIT | — | 7 hours | 35° C. | liquid |
| c | 1 mol HBA, 3 mols CL, 0.5 mol IDI | 0.15% by weight DBTL | 7 hours | 35° C. | liquid |
| d | 1 mol HBA, 2 mols CL, 0.5 mol IDI | 0.15% by weight DBTL | 7 hours | 35° C. | liquid |
| e | 1 mol HEMA, 1 mol CL, 0.5 mol IDI | — | 7 hours | 35° C. | liquid |
| f | 1 mol HBA, 4 mols PL, 0.5 mol IDI | 0.15% by weight DBTL | 7 hours | 35° C. | liquid |
| g | 1 mol HEMA, 3 mols CL 0.5 mol DIT | — | 7 hours | 35° C. | liquid |
| h | 1 mol HEMA, 1 mol CL 0.5 mol DIT | — | 7 hours | 35° C. | liquid |

HBA = 4-hydroxybutyl acrylate
HEMA = hydroxyethyl methacrylate
MMA = methyl methacrylate
CL = epsilon-caprolactone
PL = beta-propiolactone
DIT = diisocyanatotoluene
IDI = isophorone diisocyanate
DBTL = dibutyltin dilaurate The urethanes a to f were mixed with monomers as set forth in Table 3 below, and 0.5% by weight of 2-chlorothioxanthen-9-one and 2% by weight of ethyl 4-dimethylaminobenzoate were added thereto. This mixture was applied to sheet steel (200×35×0.3 mm$^3$) in a layer 25 micrometers thick, the sheet steel having previously been degreased, treated with 20% phosphoric acid, rinsed, and dried. The coated plates were irradiated with a xenon emitter (light wavelengths of from 300 to 830 nm) at a distance of 15 cm from the lamp for 15 seconds under an atmosphere of nitrogen. The intensity of radiation was 585 W/cm².

The hardened films were subjected to tests for pencil hardness and pendulum hardness according to König (DIN 53157), Bend test (cylindrical mandrel DIN 53152), and ball impact tests (ASTM-D 2794). The results of this testing are shown in the following table:

EXAMPLES 29 TO 33

The following examples show the suitability of the process according to the invention for the manufacture of adhesive bonds. The strength of the adhesive bonds so produced was measured as follows:

Test A:

The tensile shear strength according to DIN 53283 was measured on sand-blasted samples of sheet steel

Preparation and Properties of Coverings

| Example No. | Urethane[1] | Parts by Weight | Monomer | Parts by Weight | Pencil Hardness | Konig Hardness (sec) | Bend Test (mm) | Ball Impact Test (inch.-lb) | Glass transition temperature |
|---|---|---|---|---|---|---|---|---|---|
| 14 | a | 70 | butanediol diacrylate | 30 | 4 H | 56 | 2 | 48 | — |
| 15 | a | 70 | hexanediol diacrylate | 30 | 4 H | 48 | 2 | 50 | — |
| 16 | a | 70 | N-vinylpyrrolidone | 30 | 3 H | 34 | — | 24 | — |
| 17 | a | 70 | trimethylolpropane triacrylate | 30 | 4 H | 46 | 2 | 40 | −30° C. |
| 18 | b | 70 | trimethylolpropane triacrylate | 30 | 6 H | 32 | 3 | 24 | — |
| 19 | c | 70 | trimethylolpropane triacrylate | 30 | 7 H | 31 | 2 | 30 | — |
| 20 | c | 60 | trimethylolpropane triacrylate | 40 | 7 H | 45 | — | — | — |
| 21 | c | 50 | trimethylolpropane triacrylate | 50 | 7 H | 55 | — | — | — |
| 22 | d | 100 | — | — | 6 H | 240 | — | — | — |
| 23[2] | e | 100 | — | — | 6 H | 144 | — | — | — |
| 24 | f | 70 | butanediol diacrylate | 30 | 7 H | — | — | — | — |
| 25 | f | 70 | N-vinylpyrrolidone | 30 | 5 H | — | — | — | — |
| 26 | c | 100 | — | — | 3 H | — | — | — | — |

[1]From Table 2
[2]Duration of radiation - five minutes

EXAMPLE 27

An unsaturated compound, prepared in a manner similar to that of Example 1, consisting of 1 mol of hydroxyethyl methacrylate and 2 mols of caprolactone was dissolved in methyl methacrylate in a weight ratio of 70:30, and 0.5 mol of diisocyanatotoluene was added thereto, in such a manner that the temperature did not rise above 35° C. After seven hours, it was not possible to detect any free diisocyanatotoluene. An amount of 0.5% by weight of tert-butyl peroctoate was added to the resulting thin liquid urethane which was then polymerized in a manner similar to Example 2. The resulting tough-hard, glass-clear, molded article had the following properties:

| | |
|---|---|
| Tensile strength (DIN 53504) | 25.0 N/mm² |
| Elongation at break (DIN 53504) | 52% |
| Shore hardness | D 70 |

EXAMPLE 28

Example 19 was repeated with the variation that a 0.5 mm thick coating was produced on hardwood. Stubbing out of burning cigarettes discolored the wood beneath the coating, but the coating itself remained undamaged.

(DIN 1541/ST 1203, 100×20×1.5 mm³) and sheet aluminum (DIN 1783/AlCuMg 2 pl., 100×25×1.5 mm³) which had merely been overlapped (overlapped length 10 mm), using a tensile testing machine (feeding rate 20 mm/min) after curing for 72 hours at room temperature. The average value from five measurements is given.

Test B:

The strength of an adhesive bond in the case of a screw bolt was determined by measuring the torque required to detach the nut. Bolts (M 6×15, DIN 933 8.8) and nuts (M 6, DIN 934 8.8) were stuck together, stored for 12 hours at 50° C., and then separated in a vise with a torque spanner. The average value from three measurements is given.

The urethanes used in Examples 29 to 33 are listed in Table 2 above. They were additionally stabilized by adding 250 ppm of di-tert-butyl benzoquinone, based on the weight of the urethanes.

The composition of mixtures polymerizable according to the invention can be seen from Table 4 below. These mixtures (reactive adhesives) were mixed in amounts of 25 g and stored in polyethylene bottles of 100 ml capacity. The mixtures were storage-stable for more than three months. The properties of the polymers manufactured as adhesives are likewise given in Table 4.

TABLE 4

| Example No. | Urethane[1] | A-mount (g) | Comonomer | Amount (g) | Cumene Hydroperoxide (g) (80%) | Tributylamine (g) | Tensile shear strength in Test A Steel (M/mm²) | Tensile shear strength in Test A Aluminum (M/mm²) | Maximum torque in Test B (N/mm) |
|---|---|---|---|---|---|---|---|---|---|
| 29 | h | 16.4 | butanediol dimethacrylate | 7 | 1.4 | 0.2 | 3.9 | 1.5 | 60 |
| 30 | e | 23.5 | — | — | 1.25 | 0.25 | — | — | 35 |
| 31 | e | 16.4 | butanediol dimethacrylate | 7 | 1.4 | 0.2 | 6.0 | 3.3 | 75 |
| 32 | g | 16.4 | butanediol dimethacrylate | 7 | 1.4 | 0.2 | 6.1 | 3.5 | 100 |
| 33 | g | 15.8 | hydroxyethyl methacrylate | 6.8 | — | — | — | — | — |
|  |  |  | methacrylic acid | 0.7 | 1.1 | 0.25 | 13.1 | 12.8 | 100 |

[1]From Table 2

The preceding specific embodiments are illustrative of the practice of the invention. It is to be understood however, that other expendients known to those skilled in the art or disclosed herein, may be employed without departing from the spirit of the invention or the scope of the appended claims.

We claim:

1. A process for the preparation of polymers from polymerizable urethanes containing unsaturated groups and from olefinically unsaturated compounds, which comprises polymerizing (i) from about 40 to 100 percent by weight of urethanes prepared by reacting polyisocyanatoalkyl and/or polyisocyanatoaryl compounds with compounds of the formula $$A-(C-R-O)_{\overline{n}}H \quad (I)$$
$$\phantom{A-(}\|\phantom{-R-O)_{\overline{n}}H}$$
$$\phantom{A-(}O$$

wherein

R = straight-chain hydrocarbon radicals having from 2 to 10 carbon atoms which may optionally be substituted by up to 5 methyl, ethyl and/or propyl groups, wherein all the radicals R within one molecule of the Formula I may be the same or different, A = an ethylenically unsaturated radical of one of the general formulae

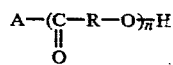
$$(CH_2=C-C-Y)_{\overline{p}}R^2-X- \quad (II)$$
$$\phantom{(CH_2=}|\phantom{-C-Y)_{\overline{p}}R^2-X-}\|$$
$$\phantom{(CH_2=}R^1\phantom{-C-Y)_{\overline{p}}R^2-X-}O$$

$$CH_2=C-O- \quad (III)$$
$$\phantom{CH_2=}|$$
$$\phantom{CH_2=}R^1$$

$$CH_2=C-CH_2-X- \quad (IV)$$
$$\phantom{CH_2=}|$$
$$\phantom{CH_2=}R^1$$

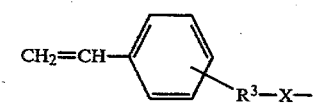

wherein $R^1$ = H or $CH_3$, $R^2$ = a (p+1)-functional straight-chain or branched alkyl radical or a (p+1)-functional cycloalkyl radical, each having from 1 to 20 carbon atoms, $R^3$ = a radical having the meaning of $R^2$ when p=1, X = —O— or —$NR^4$—, Y = —O—, —NH—, or —$NR^4$—, $R^4$ = $CH_3$ or $C_2H_5$, n = an integer of from 1 to 100, and p = an integer of from 1 to 3, in such molar ratios that the numerical ratio of the isocyanato groups to the hydroxyl groups of the compounds of Formula I is from about 0.2:1 to 1:1, with (ii) from about 0 to 60 percent by weight of olefinically unsaturated compounds, by means of radical polymerization, in the presence of initiators.

2. The process of claim 1, wherein the polyisocyantoalkyl and/or polyisocyanatoaryl compounds are selected from the group consisting of diisocyanatoalkyl compounds, triisocyanatoalkyl compounds, diisocyanatoaryl compounds, triisocyanatoaryl compounds, and mixtures of two or more of said compounds.

3. The process of claim 1, wherein the alkyl moiety of the polyisocyanatoalkyl compounds has from 1 to 6 carbon atoms.

4. The process of claim 3, wherein the polyisocyanatoalkyl compounds are selected from the group consisting of 1,6-diisocyanatohexane, trimerized hexamethylene diisocyanate, isophorone diisocyanate, trimethylhexamethylene diisocyanate, octadecylene diisocyanate, 1,4-diisocyanatocyclohexane, 4,4'-diisocyanatodicyclohexylmethane, and reaction products of trimethylolpropane and isophorone diisocyanate in a molar ratio of 1:3.

5. The process of claim 1, wherein the aryl moiety of the polyisocyanatoaryl compounds has from 6 to 12 carbon atoms.

6. The process of claim 5, wherein the polyisocyanatoaryl compounds are selected from the group consisting of diisocyanatobenzenes, diisocyanatotoluenes, 4,4'-diisocyanatodiphenylmethane, 1,5-diisocyanatonaphthalene, bis-(isocyanatomethyl)-benzenes, 4,4',4''-triisocyanato-triphenylmethanes, 4,4'-diisocyanatodiphenyls, N,N'-(4,4'-dimethyl-3,3'-diisocyanatodiphenyl)-uretidine-dione, triisocyanatodiphenyl ethers, and reaction products of trimethylolpropane and diisocyanatotoluene.

7. The process of claim 1, wherein A has the meaning of Formula II.

8. The process of claim 1, wherein, prior to polymerization, the compounds of Formula I have been reacted in equivalent amounts with polyisocyanatoalkyl and/or polyisocyanatoaryl compounds to form urethanes.

9. The process of claim 1, wherein the reaction mixture contains from 60 to 80 percent by weight of component (i) and from 20 to 40 percent of component (ii).

10. A process of claim 1 to prepare polymers useful as adhesive bonds, wherein the urethanes (i) have been manufactured by reacting polyfunctional isocyanates with compounds of Formula I in which n is an integer of from about 1 to 20.

11. The process of claim 10, wherein n is an integer of from about 1 to 10.

12. The process of claim 1, wherein A has the meaning of Formula IV.

13. A process of claims 1 or 12 to prepare polymers useful as elastomeric molded articles, wherein the urethanes (i) have been manufactured by reacting polyfunctional isocyanates with compounds of Formula I in which n is an integer of from about 2 to 100.

14. The process of claim 13, wherein n is an integer of from about 3 to 30.

15. The process of claim 1, wherein the olefinically unsaturated compounds are selected from the group consisting of acrylic acid, methacrylic acid, and esters thereof with cycloalkanols or alkanols having up to 8 carbon atoms; acrylonitrile, methacrylonitrile, styrene; substituted styrene; vinyl esters of alkanoic acids having from 1 to 18 carbon atoms; N-vinyl-2-pyrrolidone; and polyesters of acrylic acid or methacrylic acid with polyhydroxy compounds.

16. The process of claim 1, wherein the polymerization is started by producing radicals by chemical means and initiators selected from the group consisting of organic peroxide compounds and azo compounds are present.

17. The process of claim 16, wherein the initiators are present in an amount of from about 0.001 to 10 percent by weight, based on the total weight of all the monomers present.

18. The process of claim 1, wherein the polymerization is initiated by irradiation with high-energy radiation and initiators selected from the group consisting of thioxanthen-9-one, 2-methylthioxanthen-9-one, 2-chloro-thioxanthen-9-one, benzoin, benzoin alkyl ethers, benzil, benzil dialkyl ketals, benzophenone, 2,2-diethoxyacetophenone, and tetramethyldiaminobenzophenone.

19. The process of claim 18, wherein the initiators are present in an amount of from about 0.001 to 10 percent by weight, based on the total weight of all the monomers.

20. The process of claim 1, wherein the urethanes (i) are prepared by reacting one or more isocyanates selected from the group consisting of alkyl monoisocyanates, aryl hydrocarbon monoisocyanates, cycloalkyl monoisocyanates, alkane diisocyanates, cycloalkane diisocyanates, cycloalkane triisocyanates, trimerized alkane diisocyanates, aryl hydrocarbon diisocyanates, and aryl hydrocarbon triisocyanates, wherein at least some di- or tri-functional isocyanates are present, with a compound having a terminal hydroxyl group, of Formula I, where the ratio of isocyanato groups to hydroxyl groups is from about 0.2:1 to 1:1.

21. The process of claim 20, wherein the isocyanates are phenyl isocyanate, tolyl isocyanate, methyl isocyanate, butyl isocyanate, or cyclohexyl isocyanate.

22. The process of claim 1, wherein the urethanes (i) have molecular weights of from approximately 300 to approximately 20,000.

23. A reactive adhesive mixture composition which comprises an admixture of:
(i) from about 40 to 100 percent by weight of urethanes prepared by reacting polyisocyanatoalkyl and/or polyisocyanotoaryl compounds with compounds of the general formula $$A-(C-R-O)_{\overline{n}}H \qquad (I)$$
$$\phantom{A-(}\|\phantom{R-O)H}$$
$$\phantom{A-(}O$$

wherein
R = straight-chain hydrocarbon radicals having from 2 to 10 carbon atoms which may optionally be substituted by up to 2 methyl, ethyl and/or propyl groups, wherein all the radicals R within one molecule of the Formula I may be the same or different,
A = an ethylenically unsaturated radical of one of the general formulae $$(CH=C-C-Y)_{\overline{p}}R^2-X- \qquad (II)$$
$$\phantom{(CH=}|\phantom{-C-}\|$$
$$\phantom{(CH=}R^1\phantom{-}O$$

$$CH_2=C-O- \qquad (III)$$
$$\phantom{CH_2=}|$$
$$\phantom{CH_2=}R^1$$

$$CH_2=C-CH_2-X- \qquad (IV)$$
$$\phantom{CH_2=}|$$
$$\phantom{CH_2=}R^1$$

$$CH_2=CH-\!\!\left\langle\!\!\!\begin{array}{c}\\ \\ \end{array}\!\!\!\right\rangle\!\!-R^3-X- \qquad (V)$$

wherein
$R^1$ = H or $CH_3$,
$R^2$ = a (p+1)-functional straight-chain or branched alkyl radical of a (p+1)-functional cycloalkyl radical, each having from 1 to 20 carbon atoms,
$R^3$ = a radical having the meaning of $R^2$ when p=1,
X = —O— or $NR^4$—,
Y = —O—, —NH—, or $NR^4$—,
$R^4$ = $CH_3$ or $C_2H_5$,
n = an integer of from 1 to 100, and
p = an integer of from 1 to 3,
in such molar ratios that the numerical ratio of the isocyanato groups to the hydroxyl groups of the compounds of Formula I is from about 0.2:1 to 1:1, and
(ii) from about 0 to 60 percent by weight of olefinically unsaturated compounds, by means of radical polymerization.

24. The composition of claim 23, wherein the polyisocyanatoalkyl and/or polyisocyanatoaryl compounds are selected from the group consisting of diisocyanatoalkyl compounds, triisocyanatoalkyl compounds, diisocyanatoaryl compounds, triisocyanatoaryl compounds, and mixtures of two or more of said compounds.

25. The composition of claim 23, wherein the alkyl moiety of the polyisocyanatoalkyl compounds has from 1 to 6 carbon atoms.

26. The composition of claim 25, wherein the polyisocyanatoalkyl compounds are selected from the group consisting of 1,6-diisocyanatohexane, trimerized hexamethylene diisocyanate, isophorone diisocyanate, trimethylhexamethylene diisocyanate, octadecylene diisocyanate, 1,4-diisocyanatocyclohexane, 4,4-diisocyanatodicyclohexylmethane, and reaction products of trimethylolpropane and isophorone diisocyanate in a molar ratio of 1:3.

27. The composition of claim 23, wherein the aryl moiety of the polyisocyanatoaryl compounds has from 6 to 12 carbon atoms.

28. The composition of claim 27, wherein the polyisocyanatoaryl compounds are selected from the group consisting of diisocyanatobenzenes, diisocyanatotoluenes, 4,4-diisocyanatodiphenylmethane, 1,5-diisocyanatonaphthalene, bis-(isocyanatomethyl)-benzenes, 4,4',4'-triisocyanatotriphenylmethanes, 4,4'-diisocyanatodiphenyls, N,N'-(4,4'-dimethyl-3,3'-diisocyanatodiphenyl)-uretidine-dione, triisocyanatodiphenyl ethers, and reaction products of trimethylolpropane and diisocyanatotoluene.

29. The composition of claim 23, wherein A has the meaning of Formula II.

30. The composition of claim 23, wherein the compounds of Formula I have been reacted in equivalent amounts with polyisocyanatoalkyl and/or polyisocyanatoaryl compounds to form urethanes.

31. The composition of claim 23, wherein the admixture contains from 60 to 80 percent by weight of component (i) and 20 to 40 percent of component (ii).

32. The composition of claim 23, wherein the urethanes (i) have been manufactures by reacting polyfunctional isocyanates with compounds of Formula I in which n is an integer of from about 1 to 20.

33. The composition of claim 32, wherein n is an integer of from about 1 to 10.

34. The composition of claim 23, wherein A has the meaning of Formula IV.

35. The composition of claim 23, wherein the olefinically unsaturated compounds are selected from the group consisting of acrylic acid, methacrylic acid, and esters thereof with cycloalkanols or alkanols having up to 8 carbon atoms; acrylonitrile, methacrylonitrile; styrene; substituted styrene; vinyl esters of alkanoic acids having from 1 to 18 carbon atoms; N-vinyl-2-pyrrolidone; and polyesters of acrylic acid or methacrylic acid with polyhydroxy compounds.

36. The composition of claim 23, wherein the admixture also comprises initiators selected from the group consisting of organic peroxide compounds and azo compounds.

37. The composition of claim 36, wherein the initiators are present in an amount of from about 0.001 to 10 percent by weight, based on the total weight of all the monomers present.

38. The composition of claim 23, wherein the urethanes (i) are prepared by reacting one or more isocyanates selected from the group consisting of alkyl monoisocyanates, aryl hydrocarbon monoisocyanates, cycloalkyl monoisocyanates, alkane diisocyanates, cycloalkane diisocyanates, cycloalkane, triisocyanates, trimerized alkane diisocyanates, aryl hydrocarbon diisocyanates, and aryl hydrocarbon triisocyanates, wherein at least some di- or tri-functional isocyanates are present, with a compound having a terminal hydroxyl group, of Formula I, where the ratio of isocyanato groups to hydroxyl groups is from about 0.2:1 to 1:1.

39. The composition of claim 38, wherein the isocyanates are phenyl isocyanate, tolyl isocyanate, methyl isocyanate, butyl isocyanate, or cyclohexyl isocyanate.

40. The composition of claim 23, wherein the urethanes (i) have molecular weights of from approximately 300 to approximately 20,000.

* * * * *

UNITED STATES PATENT AND TRADEMARK OFFICE
CERTIFICATE OF CORRECTION

PATENT NO. : 4,328,325
DATED : May 4, 1982
INVENTOR(S) : KLAUS MARQUARDT et al.

It is certified that error appears in the above—identified patent and that said Letters Patent is hereby corrected as shown below:

Column 2, line 34, and Column 4, line 22, "oxygen or" should read -- oxygen and --.

Column 6, line 11, delete "of Formula I", first occurrence.

Column 6, line 53, "4,4', 4"-" should read -- 4,4',4"- --.

Column 13, line 44, "tetramethyla-" should read -- tetrametha- --.

In Table 1 bridging Columns 17 and 18, the right-hand entry for Example No. 5 should read -- -41 --.

In Table 4 bridging Columns 21 and 22, the middle portion of the table heading should read as follows:

```
              Cumene Hydroper-
    --          oxide (80%)           --
                    (g)
```

Claim 15, line 5, "acrylonitrile, methacrylonitrile," should read -- acrylonitrile; methacrylonitrile; --.

Claim 18, line 5, "benzoin" second occurrence, should read -- benzoic --.

UNITED STATES PATENT AND TRADEMARK OFFICE
CERTIFICATE OF CORRECTION

PATENT NO. : 4,328,325
DATED : May 4, 1982
INVENTOR(S) : KLAUS MARQUARDT et al.

It is certified that error appears in the above-identified patent and that said Letters Patent is hereby corrected as shown below:

Claim 23, line 11, "2 methyl" should read -- 5 methyl --.

Claim 23, lines 49 and 50, cancel ", by means of radical polymerization".

Claim 26, line 6, "4,4-" should read -- 4,4'- --.

Claim 28, line 4, the moiety "4,4-" should read -- 4,4'- --.

Claim 28, line 6, the moiety "4,4',4'-" should read -- 4,4',4"- --.

Claim 31, line 3, "and 20" should read -- and from 20 --.

Claim 35, line 5, "acrylonitrile," should read -- acrylonitrile; --.

Claim 38, line 6, delete the comma [,] after "cycloalkane".

Signed and Sealed this

First Day of February 1983

[SEAL]

Attest:

GERALD J. MOSSINGHOFF

Attesting Officer    Commissioner of Patents and Trademarks